United States Patent [19]

Rychlik

[11] 4,016,847

[45] Apr. 12, 1977

[54] INERTIA FUEL SEPARATOR AND VAPORIZER

[76] Inventor: Frank J. Rychlik, 5200 N. Reserve, Chicago, Ill. 60656

[22] Filed: Jan. 16, 1975

[21] Appl. No.: 541,632

[52] U.S. Cl. .................. 123/122 AA; 165/52; 123/124 R; 123/119 DB
[51] Int. Cl.² .................................. F02M 31/00
[58] Field of Search ... 123/119 R, 122 AB, 122 AC, 123/122 F, 122 AA, 127, 124 R, 124 A, 124 B, 119 DB; 261/144, 145; 165/52

[56] References Cited

UNITED STATES PATENTS

| | | | |
|---|---|---|---|
| 1,630,048 | 5/1927 | Balachowsky | 123/122 AA |
| 2,116,718 | 5/1938 | Stubbs | 165/52 |
| 2,884,917 | 5/1959 | Quinby | 123/133 |
| 2,968,297 | 1/1961 | Rauen | 123/119 R |

Primary Examiner—Ronald H. Lazarus
Attorney, Agent, or Firm—Ray E. Snyder

[57] ABSTRACT

A split-path fuel/air induction system for carbureted internal combustion engines. One embodiment of the system utilizes an annular separation chamber located directly beneath the carburetor and discharging into the intake manifold. A flow of fuel/air mixture aspirated through the carburetor enters the separation chamber and is caused to divide within the chamber. A majority of the incoming air and vaporized fuel take a sharply curved first path and are partially deflected by an annular shield within the separation chamber so as to flow directly into the intake manifold. Liquid droplets of fuel, above a minimum size, are separated from the air stream due to their own inertia and are caused to take a second path. This second path leads beneath and behind the deflector shield. A heating coil located behind the shield heats the liquid fuel causing it to vaporize and then enter the intake manifold.

An alternative embodiment also utilizes a dual-path induction system. One path aspirates only air directly into the intake manifold and the second path aspirates liquid fuel and only a small amount of air. The latter fuel/air mixture enters a heated chamber where the liquid fuel is totally vaporized and then discharged into the intake manifold.

3 Claims, 4 Drawing Figures

INERTIA FUEL SEPARATOR AND VAPORIZER

BACKGROUND OF THE INVENTION

1. Field of the Invention

This invention relates to the field of internal combustion engines and more particularly to carbureted fuel/air induction systems for such engines wherein heat is employed to vaporize liquid fuel inducted into the engine cylinders.

2. Description of the Prior Art

Carburetors for internal combustion engines have been known as long as the engines, per se. Nearly all employ some form of Venturi air passage, one or more throttle valves for restricting the entry of air into the passage, a liquid fuel reservoir, and one or more fuel jets through which liquid fuel is aspirated into the air passage by the flow of air therethrough. The fuel/air mixture from the carburetor is inducted into an intake manifold which distributes the mixture to the respective engine cylinders.

In nearly all present-day carbureted fuel induction systems, the fuel/air mixture delivered to the engine cylinders is comprised of air, vaporized fuel, and unvaporized liquid fuel droplets. This mixture is compressed and burned with a cylinder to generate power. The burning process involves the direct chemical reaction of the carbon and hydrogen content of the liquid fuel with the oxygen content of the air. The reaction is exothermic and the by-products of combustion include: carbon dioxide, water vapor, carbon monoxide, nitrous oxide and unburned hydrocarbons. The latter three are considered undesirable emissions, or air pollutants, and also represent wasted chemical energy. The allowable levels of these emissions is currently regulated closely by law and are the subject of much controversy.

A fundamental premise of the present invention presumes that the majority of the unburned hydrocarbons emitted through the engine exhaust is caused by the incomplete combustion of the fuel delivered to the cylinders in droplet form. This is predicated on the fact that the time for combustion during the power stroke of a piston is very short, and the chemical reaction that takes place requires that molecules of oxygen be in the immediate proximity of fuel molecules within this time span. The fuel molecules with the fuel droplets are effectively encased within a coating of other fuel molecules and an outer coating of molecules that have already reacted with oxygen. The unburned cores of the droplets are discharged through the engine exhaust.

Numerous attempts have been made to vaporize the fuel prior to delivery to the engine cylinders by application of heat to the fuel/air mixtures. Most of these attempts have failed because the application of heat in this manner also heats the incoming air causing it to expand - with a corresponding loss in volumetric efficiency. The power generated within an engine cylinder depends on the weight of the burned fuel/air mixture - not its volume.

In modern-day automotive engines, the fuel/air mixture inducted through the carburetor is caused to impinge against a heated surface within the intake manifold. This surface is generally heated by exhaust gases or by water circulated through the engine cooling jacket. The fuel droplets that impinge against the heated surface evaporate and return to the intake air stream. The great majority of the fuel droplets flow directly with the air stream to the engine cylinders. If the heated surface is too hot, the fuel droplets that impinge boil off violently and return to the air stream in droplet form.

In my prior U.S. Pat. No. 3,821,941 entitled: Valving for Internal Combustion Engine, I described a system for inducting a fuel/air mixture into a 2-cycle engine cylinder as a rapidly swirling mass. A portion of the exhaust gases from the prior cycle was entrapped with the incoming mixture and could cause self-ignition of the mixture due to the combined heat of the exhaust gas and heat of compression produced by the piston. It was also observed in this system that leaner than conventional fuel/air mixtures could be fired, with a measured increase in power output. It was presumed that the thorough intermixture of the rapidly swirling incoming mixture with the hot exhaust gases caused better chemical combination of the fuel and air. The heat due to the entrapped exhaust gases was also effective to break up fuel droplets in the inducted mixture, as evidenced by the lower exhaust emissions.

It is apparent that the fuel inducted into a cylinder should be completely vaporized prior to combustion. In Diesel engines, the liquid fuel is injected as a finely atomized mist. The mist is liquid fuel in droplet form, and the black smoke ejected under some operating conditions, particularly wide-open-throttle, is visual evidence of incomplete combustion.

SUMMARY OF THE INVENTION

It is a primary object of the present invention to control the quality of the fuel/air mixture inducted into an internal combustion engine.

More particularly, it is an object to provide means for almost completely vaporizing the liquid fuel content of the inducted mixture without increasing significantly the temperature of the inducted air.

It is a still more particular object to provide a dual-path fuel/air induction system effective to trap and vaporize the liquid fuel droplets contained in a rapidly moving air stream. The liquid droplets are separated from the air stream by the inertia of the droplets when the stream is deflected into a sharply curved path.

DETAILED DESCRIPTION OF THE DRAWINGS

Figure 1:
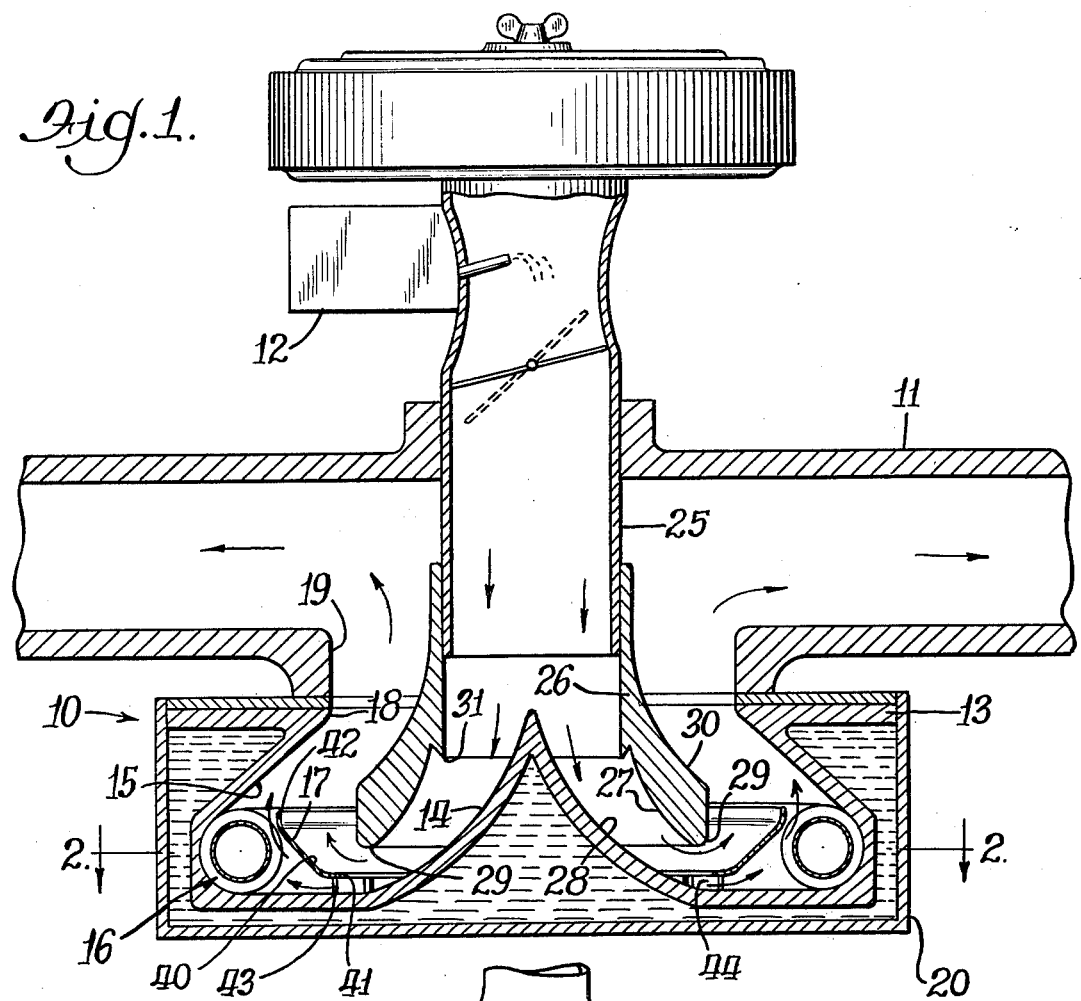
FIG. 1 is a cross-sectional side view of an internal combustion engine air intake manifold with the inertia fuel separator and liquid fuel vaporizer attached.
Figure 2:
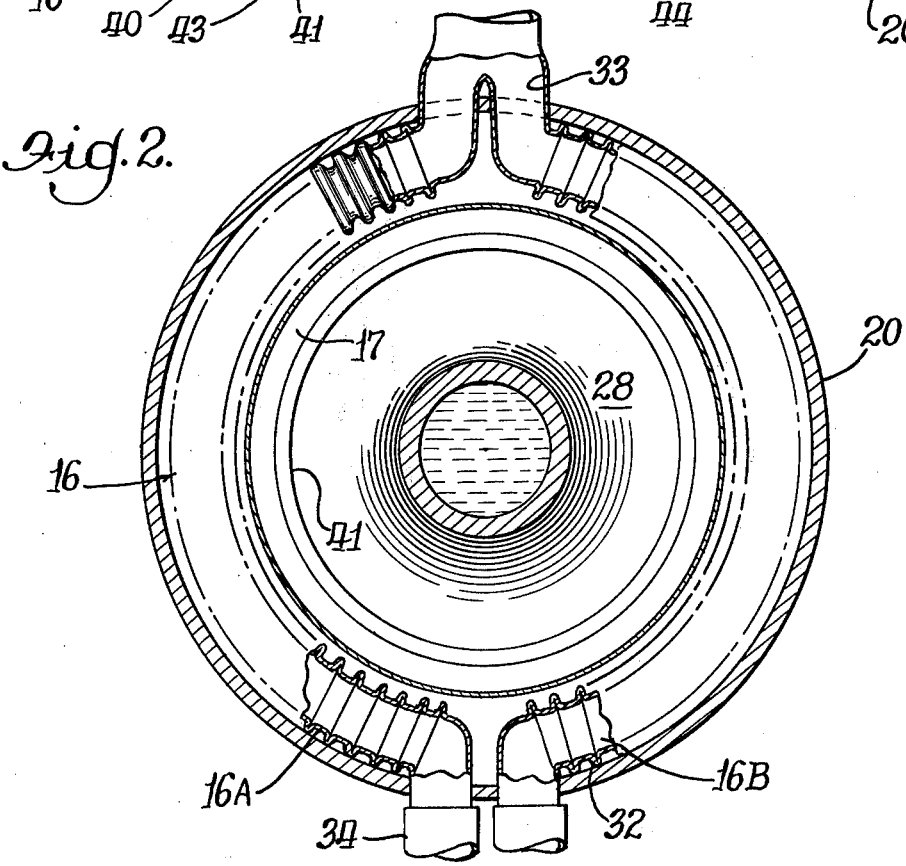
FIG. 2 is a top view, partially cut away, taken on line 2—2 of FIG. 1.

The inertia fuel separator and vaporizer of the present invention is shown in FIGS. 1 & 2 and is designated generally by the numeral 10. The separator 10 is attached to the underside of a modified air intake manifold 11 of an internal combustion engine (not shown). The separator 10 is located directly beneath a carburetor 12, shown schematically in FIG. 1.

The separator 10 comprises an annular chamber 13 formed with a raised central cone 14 and an under-cut annular recess 15. A heating coil 16 is retained within the annular recess 15 and an annular deflecting shield 17 rests against the coil 16. The chamber 13 has an upper circular opening 18 which registers with a circular opening 19 formed in the bottom of the manifold 11. The chamber 13 may also have an outer shell 20 which defines a water circulation jacket between its inner surface and the outer surface of the chamber 13.

The separator 10 also includes a vertical cylindrical intake tube 25 connected to the carburetor 12 and directed into the center of the chamber 13. The axis of the tube 25 preferably is co-axial with the axis of the central cone 14. A flared cylindrical flow-directing horn 26 is attached to and surrounds the intake tube 25. The horn 26 opens into the chamber 13 and partially surrounds the cone 14. The horn 26 may be adjustable up-and-down on the tube 25 to control the flow of fuel/air mixture into the chamber 13. An inner surface 27 on the horn 26, and an outer surface 28 on the cone 14 define a directed air flow path for the fuel/air mixture coming from the carburetor 12. The horn 26 also has a highly curved lip or lower edge 29 and an outer surface 30. The interior surface of the horn 26 is cylindrical, to match the outer surface of the tube, and terminates at a circular undercut sharp edged lip 31 immediately above the upper end of the surface 27.

The heating coil 16 may be in the form of a flexible tube, preferably made of stainless steel, and formed with a pleated outer surface 32. The coil 16 may also be divided into two halves 16A and 16B, as shown in FIG. 2. An inlet conduit 33 to the two halves of the coil 16 is connected to be supplied with heat from the exhaust manifold (not shown) of the engine. The outlet conduit 34 for the two halves is connected to discharge into the engine exhaust or tail pipe (not shown).

The annular deflecting shield 17 has a curved flow-directing outer surface 40, a lower leading edge 41, and an upper trailing edge 42. The leading edge 41 may be formed with intermittent supporting tabs 43 so as to define a flow-directing slot 44 between the leading edge 41 and the conical surface 28 at the base of the cone 14.

In operation, the inertia fuel separator and vaporizer functions as follows:

The carburetor 12 delivers a fuel/air mixture into the intake tube 25. The fuel/air mixture is comprised of air, vaporized fuel, and droplets of unvaporized fuel. A portion of the liquid fuel collects on the interior surface of the tube 25 and horn 26 and travels downward as a liquid film. This film collects into droplets at the lip 31 and fall into the air stream. The weight of these droplets cause them to impinge on the surface 28 of the cone 14. The main flow of the fuel/air mixture is directed between the inner surface 27 of the horn 26 and the outer surface 28 of the cone 14. The droplets of fuel contained in the fuel/air mixture impinge on the surface 28 due to their own inertia or due to centrifugal force when the air stream makes a sharp turn around the curved lip 29. The droplets that collect on the surface 28 flow downward as a film to the base of the cone 14. The heat supplied beneath the cone 14 causes a portion of the fuel to vaporize and enter the main air stream. The liquid film on the surface 28 flows through the slot 44 into the space occupied by the coil 16, behind the shield 17. The heat from the coil 16 causes the liquid fuel to vaporize rapidly and it is returned to the air stream above the trailing edge 42. The coil 16 should supply sufficient heat to maintain the temperature in the space behind the shield 17 in the range of 350° F to 500° F.

A majority of the lighter air and vaporized fuel in the air stream passes above the leading edge 41 of the shield 17 and passes around the sharply curved lip 29 of the horn 26. The shield 17 insulates the air stream from heat radiated by the coil 16 and the outer surface 40 serves to deflect the flow without bringing the air into into contact with the heating coil 16. Only a small portion of the air stream flows through the slot 44 and is partially heated by the coil 16. This air assists in delivering fuel vaporized by the coil 16 back to the air stream. The proportion of the fuel/air mixture passing above and below the leading edge 41 depends on the relative widths of the slot 44 and the gap between the lip 29 and the leading edge 41. The relative spacings may vary with different engines for optimum performance. Having the horn 26 vertically adjustable on the tube 25 also helps to make it adaptable to various engines. The height of the slot 44 may also be controlled by establishing an optimum height for the tabs 43 for a particular engine. The shield 17 may also be attached directly to the horn 26 by supporting ribs (not shown).

The separator 10 was installed in a vehicle for road and dynamometer tests. The vehicle selected was a 1971 Ford Pinto with a 4-cylinder-2000 cc. engine, and automatic transmission. The separator 10 was installed by removing the existing air intake manifold and replacing it with a modified manifold 11 with the chamber 13 attached. The tube 25 and horn 26 were attached to the carburetor 12 directly above the cone 14.

The only other modifications to the engine were to replace the fuel metering jet in the carburetor and connect the heating coil to the exhaust manifold. The original equipment jet had a diameter of 1.37 mm. and was replaced by a 1.27 mm. jet. This change was necessary for proper performance because it was found that the larger sized jet caused the engine to run too rich. Carbon deposits tended to build up in the engine which caused it to cycle after the ignition was turned off.

Driver observed power and driveability of the vehicle were unchanged, or slightly improved by installation of the invention. Acceleration road tests of the vehicle from 0 to 60 mph were made and averaged out at about 16.3 sec. Chassis dynamometer tests of steady state performance were also measured with different degress of spark timing. These results are set fort in Tables 1, 2, & 3 below.

Table 1.

| Timing set at 11° advance | |
| --- | --- |
| Speed (mph) | MPG |
| 40 | 38.27 |
| 30 | 39.45 |
| 25 | 38.90 |
| 20 | 38.95 |
| 15 (2nd gear) | 33.38 |

Table 2.

| Timing set at 18° advance | |
| --- | --- |
| Speed (mph) | MPG |
| 40 | 38.26 |
| 25 | 41.91 |

Table 3.

| Timing set at 5° advance | |
|---|---|
| Speed (mph) | MPG |
| 40 | 37.58 |
| 25 | 39.85 |

Steady state fuel economy data for the size vehicle and engine used in the above tests are readily available from other sources. The dynamometer test data above correlated closely with comparable data obtained from road tests.

The embodiment of the invention described above and shown in FIGS. 1 & 2 is intended to be added as a modification to existing engines. The same principles of operation, for the most part, are incorporated in the embodiment shown in FIGS. 3 & 4 which is intended to be designed and utilized as original equipment.

Figure 3:
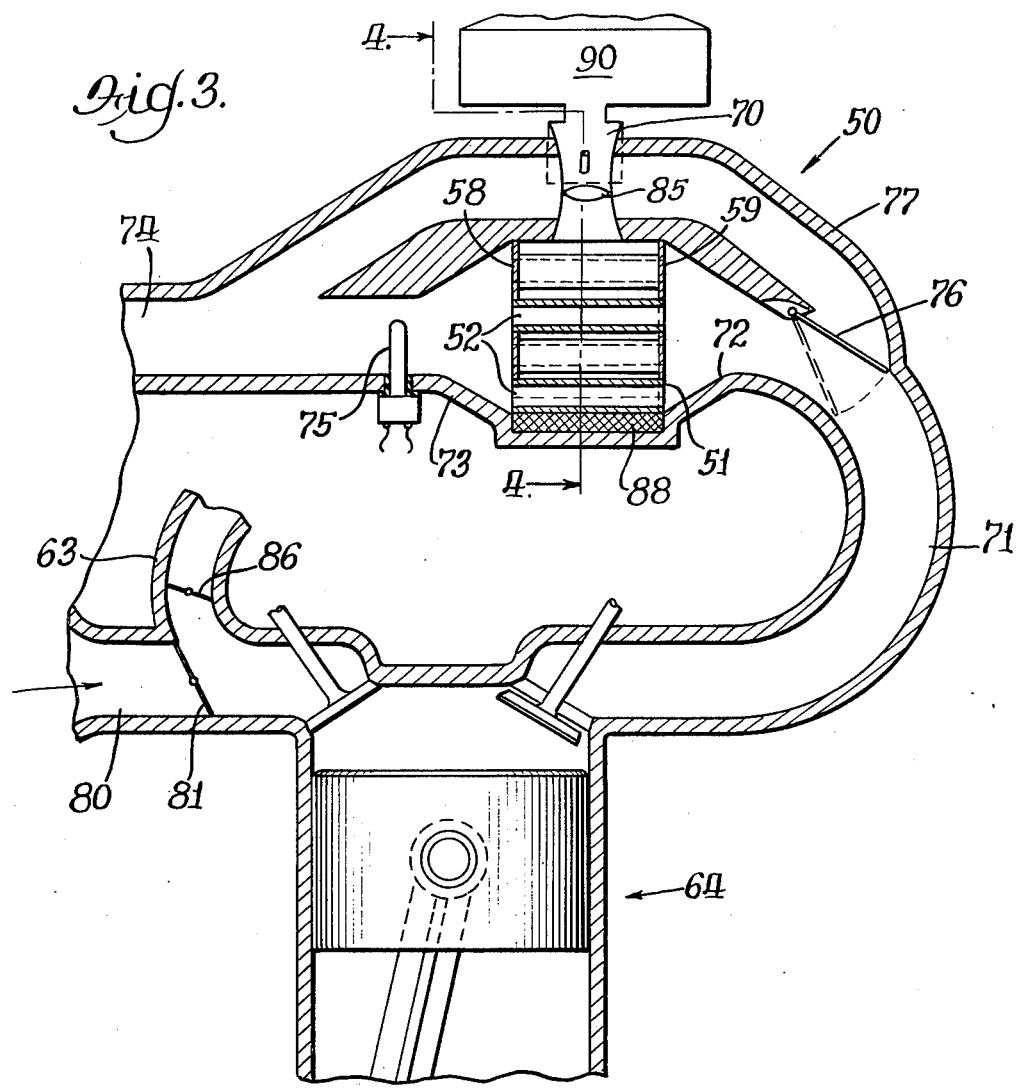
FIG. 3 is a schematic side view of an alternative fuel vaporizer and fuel induction system as connected to an engine cylinder.
Figure 4:
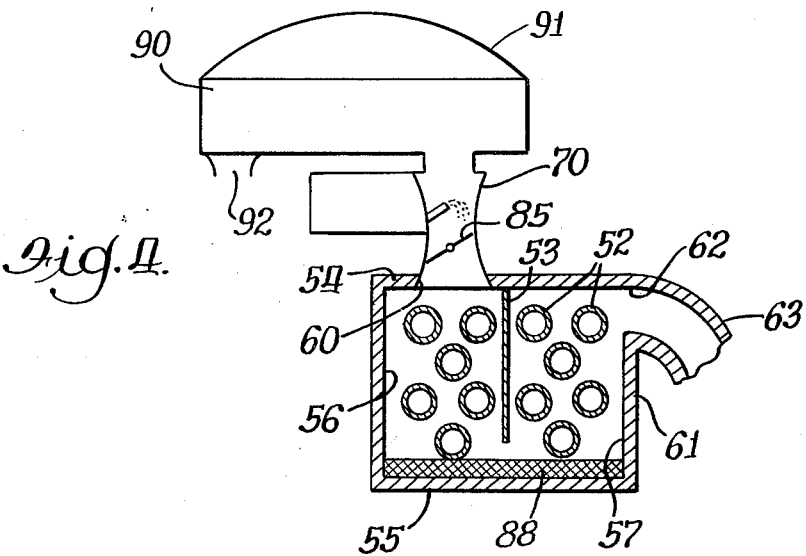
FIG. 4 is a sectional side view of the fuel vaporizer, taken on line 4—4 of FIG. 3.

The fuel separator and vaporizer shown in FIGS. 3 & 4 is designated generally by the numeral 50. The separator 50 comprises an externally insulated box-like housing 51 with a plurality of heat-exchange tubes 52 mounted transversely within the housing 51. A vertical wall-like baffle 53 is mounted within the housing 51 ad extends from the top 54 to nearly the bottom 55. The baffle 53 divides the housing 51 into two chambers 56 and 57, and the slot existing between the bottom of the baffle 53 and the bottom 55 of the housing 51 defines an air-flow passage between the chambers 56 and 57. The parallel end walls 58 and 59 of the housing 51 serve as headers for mounting the horizontal heat-exchange tubes 52. The top 54 is formed with an inlet aperture 60 opening into the chamber 56, and the side wall 61 is formed with an outlet aperture 62 opening into an intake manifold 63 of an engine 64.

A small fuel-metering carburetor 70 is mounted above the inlet aperture 60 and inducts all of the liquid fuel and a small amount of the air required for engine operation. The air inducted through the carburetor 70 may be approximately 10% to 20% of the total air required for engine operation.

The heat-exchange tubes 52 are connected to be supplied with heat from the engine exhaust manifold 71 through a supply conduit 72. The tubes 52 are also connected to discharge heat through an outlet conduit 73 to the engine exhaust 74. The flow of heat through the exchange tubes 52 should be controlled so as to maintain a temperature within the chambers 56 & 57 in the range of 350° F to 500° F. This can be accomplished by means of a thermostat 75 placed in the outlet conduit 73 and a thermostatically controlled valve 76 placed in the supply conduit 72. The valve 76 may restrict the flow of air through the supply conduit 72, and may be operated in conjunction wth a by-pass conduit 77. (The thermostat 75 may also be of the bi-metal type with a linkage connection to the valve 76).

The main air supply conduit 80 has a throttle valve 81 and opens directly into the intake manifold 63 to supply the primary air for combustion. The throttle valve 81 may be linked or otherwise connected to operate in conjunction with the controls of the carburetor 70 for various engine operating demands. The carburetor 70 has a throttle valve 85 which is mechanically linked to a secondary throttle valve 86 mounted in the intake manifold 63.

The separator 50 preferably also has an electrically heated plate 88 located within the bottom of the housing 51. The plate 88 is heated from a suitable electrical source for starting and during engine warm-up, and is disconnected when the engine reaches normal operating temperature. The thermostat 75 may serve to control this operation as well as control the valve 76.

The carburetor 70 is supplied with air through an air cleaner housing 90 which has a domed roof 91. The air inlet port 92 to the housing 90 is located on the underside of the housing 90. The domed roof 91 collects condensed fuel that is vaporized from the carburetor 70 after the engine is turned off. The inlet port on the underside of the housing 90 prevents the escape of vaporized fuel to the atmosphere.

In operation, the separator 50 functions as follows:

For starting, the throttle valve 81 is closed and fuel is aspirated through the carburetor 70 into the chamber 56 of the separator 50. The fuel/air mixture supplied is quite rich, and is comparable to the starting mixture in a convention engine with the automatic choke valve closed. (No choke valve is employed or required in this embodiment of the invention.) The plate 88 is heated electrically causing the liquid fuel to vaporize and discharge through the chamber 57 and outlet port 62 into the intake manifold 63 where it is delivered to the engine cylinders for starting the engine.

As the engine begins to run, the main throttle valve 81 is opened, admitting a larger proportion of air. The heat from the engine exhaust is delivered through the supply conduit 72 to the heat exchange tubes 52. The heated tubes 52 warm the interior of the chambers 56 and 57 so as to raise the temperature to a point within the range of 350° F to 500° F. The liquid fuel droplets entering the separator 50 are totally vaporzied within the chambers 56 and 57 before delivery to the intake manifold 63. The baffle 53 prevents droplets of fuel from being carried to the outlet port 62, except as a vapor.

The air inducted through the carburetor 70 is also heated within the chambers 56 and 57 where it expands, with a resultant loss in volumetric efficiency. However, this is only 10% to 20% of the total air required, and this air serves as a carrier for the vaporized fuel.

The main air supply is through the conduit 80 and is unheated. This air is combined with the air and vaporized fuel mixture supplied from the manifold 63, and the combined mixture is supplied to the engine. Since 80% to 90% of the inducted air is unheated, the efficiency of the engine remains high. It is contemplated that the volumetric efficiency of the engine can be increased substantially by cooling the main intake air prior to induction by refrigeration means (not shown). When such means are employed, the induction system can perform as a mini-supercharger.

In my prior U.S. Pat. No. 3,821,941, hot exhaust gas was utilized to produce self-ignition of a fuel/air mixture. It was observed that the engine ran the same on 65 octane T.V.O., 91 octane gasoline, and 120-130 octane aviation fuel. It is contemplated that the utilization of heat to vaporize the fuel, in the manner described in the embodiments above, can permit a wide range of octane rated fuels to be used. Once the fuel is broken up, the chemical energy released through oxidation of the fuel molecules is relatively independent of the original octane rating of the fuels. It may also be possible to use a light fuel for starting, and switch over to a heavier fuel once the engine has attained operating temperature.

It is to be understood that the embodiments shown and described are preferred examples only and that it is apparent that many changes and modifications can be made without departing from the spirit of the invention. The invention is not to be considered as limited, except in-so-far as the claims may be so limited.

I claim:

1. A fuel/air induction system for an internal combustion engine having a plurality of combustion cylinders compising:

an intake manifold for distributing a fuel/air mixture to the engine cylinders;

a downdraft carburetor for delivering an enriched fuel/air mixture to said manifold;

a heated vaporization chamber having a top member, side members, and a bottom member, and having said top member formed with an intake aperture to allow the fuel air mixture to enter the chamber for vaporizing liquid fuel contained therewithin a plurality of heat exchange tubes mounted within said chamber and extending between said side members and adapted to be connected to an exhaust gas heat source of said internal combustion engine;

first conduit means connected to said intake aperture for supplying fuel from said carburetor into said chamber said chamber also having one side member formed with an outlet aperture near said top member;

second conduit means connected to said outlet aperture to deliver vaporized fuel from said chamber to said intake manifold;

baffle means mounted within said chamber and extending between said side members and from said top member nearly to the bottom member of said chamber and effective to obstruct the passage of liquid droplets of fuel from said intake aperture into said and outlet aperture;

first throttle valve means mounted within said second conduit means and operable to control the flow of vaporized fuel therethrough;

third conduit means connected to said intake manifold for delivering pure air into said manifold; and second throttle valve means mounted within said third conduit means and operable to control the flow of air therethrough for thereby controlling engine operation.

2. The fuel/air induction system of claim 1, including;

fourth conduit means connected to deliver exhaust gas heat from the engine cylinders to said vaporization chamber; and third throttle valve means mounted within said fourth conduit means and effective to control the amount of exhaust gas heat delivered to said vaporization chamber.

3. The fuel/air induction system of claim 1, including:

an air cleaner housing mounted above the carburetor and adapted to admit air into said carburetor;

air induction means formed on the underside of said housing; and a domed roof formed on the top of said housing for collecting condensed fuel thereon after the engine is shut off.

* * * * *